July 26, 1927.
L. C. HUCK
1,636,820
FINAL DRIVE FOR MOTOR TRUCKS
Filed Feb. 16, 1920
2 Sheets-Sheet 2
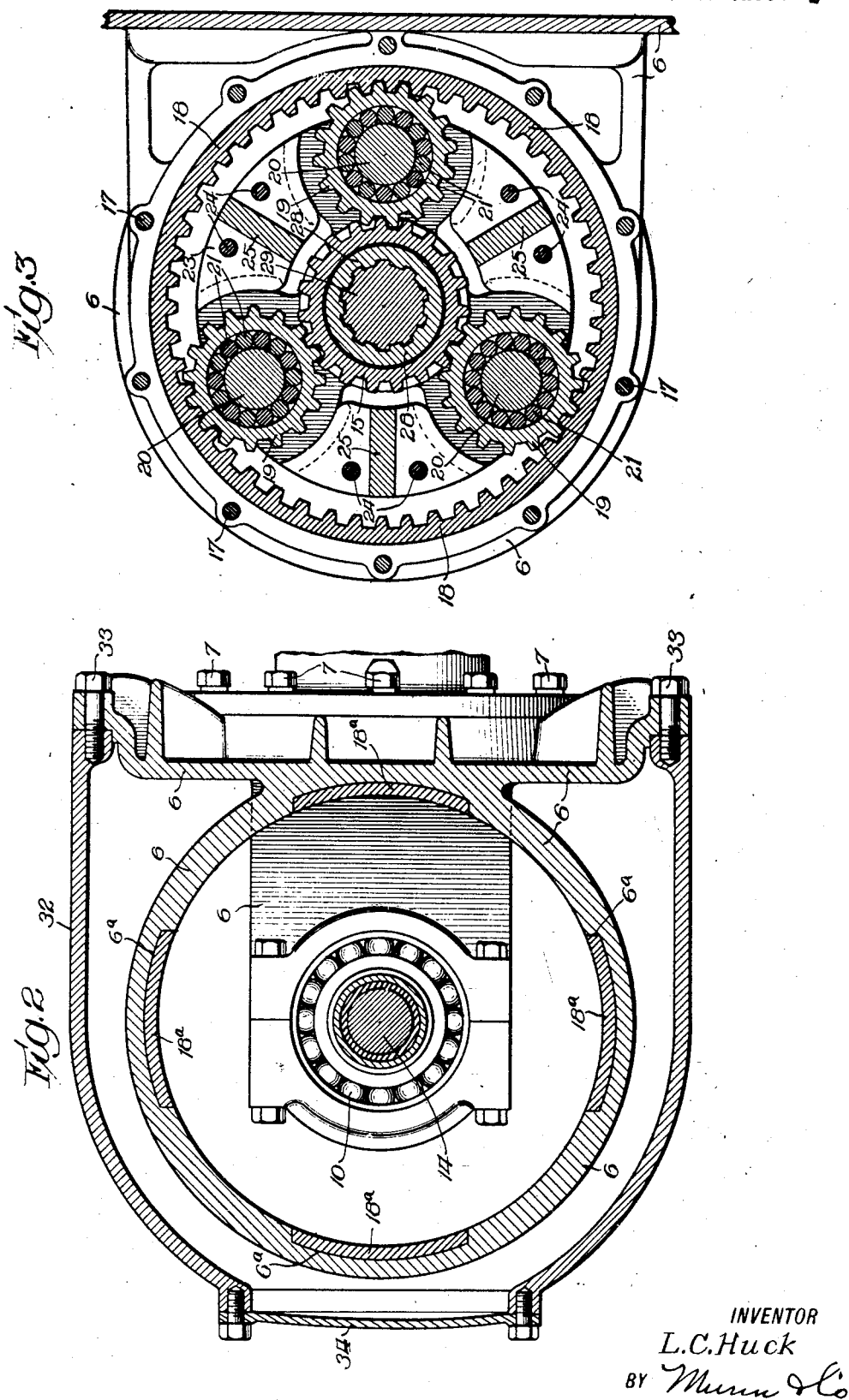
INVENTOR
L.C.Huck
BY Munn & Co
ATTORNEYS Patented July 26, 1927.

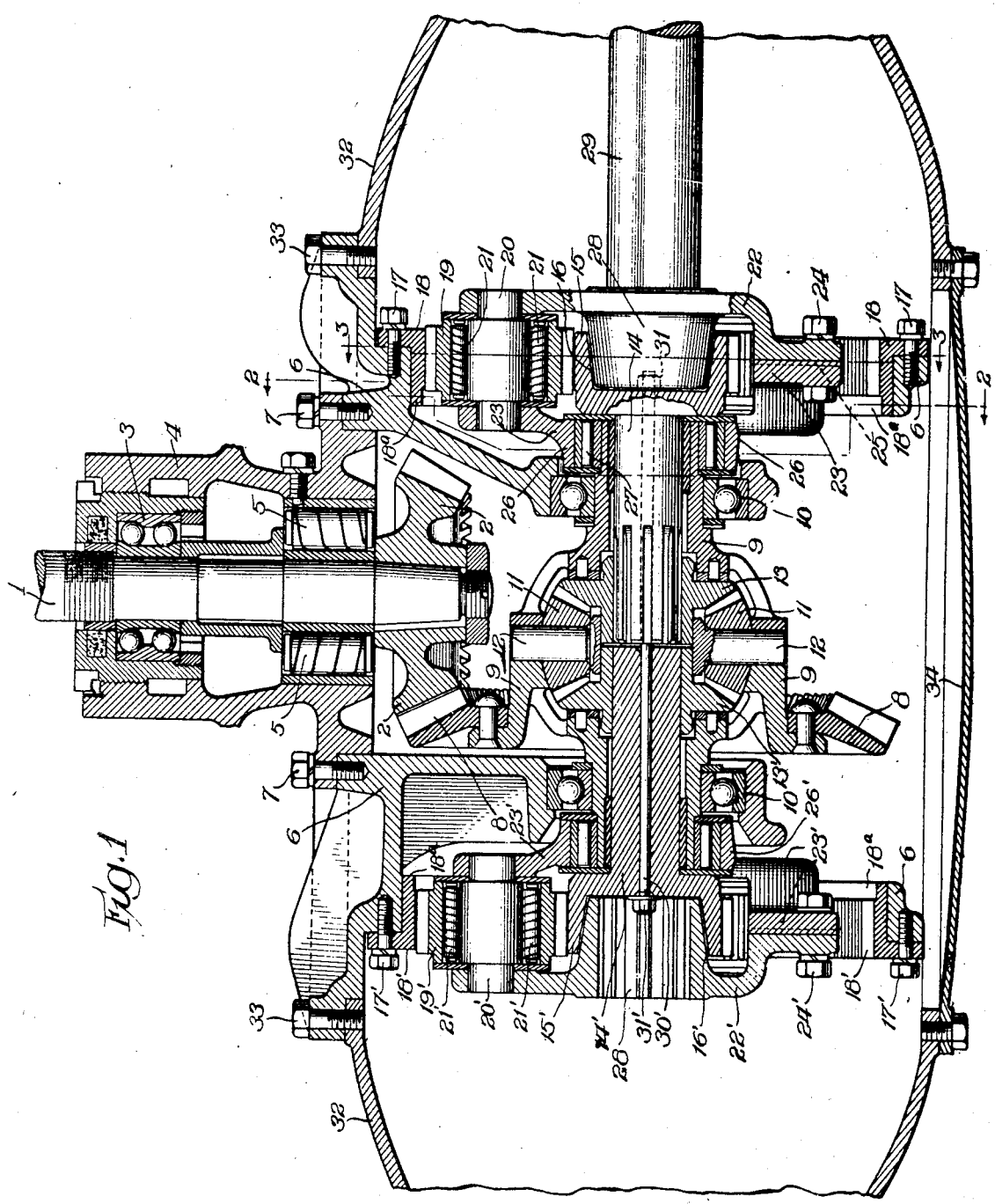

1,636,820

UNITED STATES PATENT OFFICE.

LOUIS C. HUCK, OF CHICAGO, ILLINOIS, ASSIGNOR TO HUCK AXLE CORPORATION, OF CHICAGO, ILLINOIS, A CORPORATION OF ILLINOIS.

FINAL DRIVE FOR MOTOR TRUCKS.

Application filed February 16, 1920. Serial No. 358,905.

My invention relates to improvements in final drive mechanism for motor trucks, and it consists in the combinations, constructions and arrangements herein described and claimed.

An object of my invention is to provide a final drive in which the entire driving mechanism is in one unit which is removable as a unit, in which the parts are readily accessible and are arranged for thorough lubrication, and a construction which insures correct alinement of the rotating parts, thus avoiding any possibility for torsional strains.

A further object of my invention is to provide a final drive which will permit of ample road clearance, due to the novel arrangement whereby, although spur gears are used for speed reduction, and efficiency is consequently greater than in the worm drive, the arrangement is such that no relatively large gears are necessary, thus providing for the clearance desired.

A further object of my invention is to provide a final drive in which there is less wear and consequently longer life of the gears and their associated mechanism, due to an arrangement whereby a maximum torque is delivered at the wheels with low tooth and bearing pressures.

A further object of my invention is to provide a novel arrangement of planetary gearing by means of which overhanging loads are avoided, thereby eliminating any tendency of the planetary gearing to skew.

A further object of my invention is to provide a final drive of the type described in which the parts may be readily assembled and held in assembled position by means of a novel arrangement which permits the ready removal of the parts for inspection or replacement.

Other objects and advantages will appear in the following specification, and the novel features of the invention will be particularly pointed out in the appended claims.

My invention is illustrated in the accompanying drawings, forming part of this application, in which Figure 1 is a horizontal sectional view through the device, Figure 2 is a section along the line 2—2 of Figure 1, looking in the direction of the arrows, and Figure 3 is a section along the line 3—3 of Figure 1, looking in the direction of the arrows.

In carrying out my invention, I make use of a pinion shaft 1 which is connected to the propeller shaft (not shown) of the truck in any suitable manner, and which is provided on its inner end with a pinion 2. The pinion shaft is provided with a ball bearing unit 3 held in a housing 4, and also with roller bearings 5. The pinion shaft housing 4 is secured by bolts 7 to a driving mechanism carrier frame 6 which carries the differential.

The pinion 2 is in mesh with the large gear 8 of the differential, the latter being secured to a hub 9 which is rotatably mounted in ball bearings 10 carried by the frame 6. The hub 9 is formed in the shape of a spider and bears pinions 11 which are rotatable on fixed stub shafts 12. The pinions 11 engage gears 13 and 13' which are splined on the ends of stub axles 14 and 14' respectively.

The stub axles 14 and 14' bear driving pinions 15 and 15' respectively, these pinions being recessed, as shown at 16 and 16' respectively, for a purpose to be explained later.

Secured on each side of the differential is a planetary gearing. A description of one of these gearings will suffice, since they are both alike. Secured to the carrier frame 6 by means of bolts 17 is an internal gear 18. This gear has a plurality of tongues 18ª (see Figure 2) arranged to enter corresponding grooves 6ª in the frame 6 to hold the gear in position and to prevent any tendency for the gear to rotate. Arranged to mesh with the gear 18 are pinions 19 which are carried by pins 20, roller bearings 21 being provided for each gear. The stub shafts are secured at their ends to plates 22 and 23. The latter are spaced apart at the points where the stubs are secured, but between the shafts the plates are brought together and are secured by means of bolts 24. The plate 22 has tongues 25 which enter corresponding grooves in the plate 23 (see Figures 1 and 3) for the purpose of preventing any relative movement between the plates. The plate 23 is extended to form a hub portion 26 which is arranged to turn on roller bearings 27 disposed externally of the hub 9. The plate 22 is provided with an integral sleeve portion 28 which extends into the recess 16 in the end of the stub axle 14. The sleeve portion is splined in the manner indicated at 28' at the left of Figure 1 to receive the end of the axle 29. The planetary gearing on the opposite side of the differential is designated by the members 15' to 28' inclusive. The stub axles 14 and 14' have alined axial bores arranged to receive a tie rod or wire 30', ends 31 and 31' being provided for holding the stub axles in position while permitting the rotation of one stub axle with respect to the other.

The final drive described thus far may be mounted in the differential casing. To this end the differential carrier frame is secured to the axle housing or casing 32 by means of bolts 33, a plate 34 being provided on the opposite side for purposes of inspection or applying lubricant.

From the foregoing description of the various parts of the device, the operation thereof may be readily understood. The rotation of the pinion spindle 1 drives the differential in the ordinary manner. Instead, however, of driving the axles directly from the differential, there is a second reduction which is attained by the planetary gearing. Thus the drive pinions 15 and 15' cause the rotation of the gears 19 and 19' which travel around the internal gears 17 and 17', thus turning the axles 29 and 29'.

There are a number of advantages to be gained in a device constructed as described. It will be noted that the gearing is disposed at the center of the housing 32 away from the wheels. This permits the inertia of the axle shafts to absorb the rotative road shock which is a rotative vibration very destructive to gears, causing undue wear. Furthermore, by having the gears at the center of the axle, they can be enclosed in a dust proof housing and can rotate in a bath of oil. As stated before, by using planetary rotation, the required reduction may be obtained without relatively large gears, so that great road clearance is obtained. In the construction disclosed herein, any type of standard wheel may be used, such as a wood, a steel, or a cushion wheel. One advantage of the structure herein set forth over a worm drive lies in the fact that in the present instance the differential is in the high speed member, which requires a smaller capacity differential for transmitting the same power. Consequently, smaller bearings may be used. It should be noted that in the construction set forth, all stationary parts are rigidly fastened to the differential carrier. This has an advantage in that, by removing the axle shafts and the circle of bolts 33 which fastens the entire differential carrier to the casing or axle housing 32, the entire driving mechanism may be removed as a unit. This enables all adjustments to be made on a bench and allows easy interchangeability and replacement of parts. Where a fleet of trucks is being operated, it is very desirable to have complete driving units which may be inserted in the axle housing to replace any driving unit with which trouble is being experienced, or to change the gear ratio without making any permanent changes on the carrier. It should be noted that the design of the final drive as set forth herein allows for a very large range of gear reductions by simply changing the beveled pinion 2 and the gear 8.

I desire to call particular attention to the novel means employed for piloting the rotating planetary set and insuring correct pitch line contact of the teeth of the planetary gears, not only with the internal ring gear which is rigidly fastened to the differential carrier frame, but also to the teeth of the spur pinions on the ends of the stub axle shafts.

As has been stated, the planetary set is mounted on anti-friction bearings on the hub 9. The hub as well as the stub axles 14 and 14', and the gears 18 and 18', have a common axis. The planetary set must therefore revolve concentrically with the center of the internal gears and the stub axles, thereby insuring correct pitch line contact with both the driving pinion and internal gear.

I claim:

1. In a final drive for automotive vehicles of the type having a differential gearing mounted in a housing and operatively connected for driving a pair of stub axles, means extending longitudinally of the stub axles for holding them together longitudinally while permitting them to rotate relatively to each other, a planetary gearing operatively connected with each of said stub axles, each of said planetary gearing comprising a pair of plates rigidly connected together to contact at certain points and spaced apart between said points, gears carried in the spaces between the plates, said plates being driven by the planetary gearing and in turn driving an axle shaft.

2. A final drive for automotive vehicles comprising a housing, a pinion shaft having one end terminating within the housing, a gear arranged to mesh with said pinion, a hub for said gear, a frame secured to said housing for supporting the hub, a pair of plates rigidly connected together and rotatively mounted on said hub at each end thereof, a plurality of pinions carried between the plates of each pair, an internal gear secured to said frame on each side of said pinion shaft, each of said internal gears being arranged to mesh with its individual set of pinions, an axle connected with each of said pairs of plates, means for transmitting the movement of the first named gear at a reduced speed to the pinions carried by the plates, said last named means including a pair of stub axles in axial alinement with said axle shafts, and a gear at the end of each of said stub axles in mesh with its individual set of pinions.

3. A final drive for automobile vehicles comprising an axle housing, a pinion shaft having one end terminating within the housing, differential gearing disposed within the housing and operated by said pinion shaft, a pair of stub axles operatively connected to said differential gearing, said axles terminating in pinions having open ended recesses therein, a plate having a hub adapted to extend into the open recess of each of said pinions, said hub having a central bore for the reception of the driven axle, a driven axle rigidly mounted therein, planet pinions rotatively mounted on said plate and an internal ring gear adapted to mesh with said planet pinions and means for mounting said ring gear on said housing.

4. A final drive for automotive vehicles comprising an axle housing, a pinion shaft having one end terminating within the housing, a differential gearing disposed within the housing and operated by said pinion shaft, a pair of stub axles operatively connected to said differential gearing, each of said stub axles terminating in a pinion having an open ended recess, a plate having a hub adapted to extend into the recess of its associated pinion, and provided with a central opening, a second plate spaced from said first plate mounted to rotate about each stub axle, and a plurality of planet gears rotatably carried between said spaced plates and meshing with said pinion on said stub axle, an internal ring gear stationarily mounted on said housing and meshing with said planet gears, and an axle adapted to be rigidly connected to the first mentioned plate within the opening thereof.

5. In a final drive for automotive vehicles an axle housing, a drive pinion, a first speed reduction gear carrying a differential and having a laterally extending hub on each side, a pair of stub axles each driven by the differential and supported in its associated hub, a spur gear on each stub axle, planet gears driven by each spur gear, a ring gear fixed to said housing and coacting with said planet gears, a pair of plates rotatably mounted on said hub and providing supports for said planet gears, a frame secured in said housing, and each of said hubs journaled in said frame to form a support for said speed reduction gear, differential, stub axles, planet gears and plates.

6. In a final drive for automotive vehicles, an axle housing, a driving gear, a first speed reduction gear driven thereby and having a hub extending on each side thereof, a differential, a second speed reduction gear including planet gears of a planetary gearing, a plate rotatively carrying said planet gears, a frame secured in said housing, said hub being journaled in said frame and said plate being journaled on said hub.

7. In a final drive for automotive vehicles, an axle housing, a driving gear, a first speed reduction gear driven thereby and having a hub extending on each side thereof, a differential, a second speed reduction gear including planet gears of a planetary gearing, a plate rotatively carrying said planet gears, a frame secured in said housing, said hub being journaled in said frame and said plate being journaled on said hub, said frame, first speed reduction gear, differential, second speed reduction gear and plate being removable together as a unit from the housing.

LOUIS C. HUCK.